(12) United States Patent
Ohms et al.

(10) Patent No.: US 8,875,575 B2
(45) Date of Patent: Nov. 4, 2014

(54) YAW RATE SENSOR

(75) Inventors: Torsten Ohms, Vaihingen/Enz-Aurich (DE); Burkhard Kuhlmann, Reutlingen (DE); Daniel Christoph Meisel, Vaihingen an der Enz (DE); Rolf Scheben, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 13/134,024

(22) Filed: May 25, 2011

(65) Prior Publication Data

US 2011/0296913 A1    Dec. 8, 2011

(30) Foreign Application Priority Data

Jun. 2, 2010    (DE) .................... 10 2010 029 634

(51) Int. Cl.
*G01C 19/56*    (2012.01)
*G01C 19/5755*    (2012.01)

(52) U.S. Cl.
CPC .................... *G01C 19/5755* (2013.01)
USPC ...................................... 73/504.12

(58) Field of Classification Search
CPC .................................. G01C 19/5747
USPC ........................... 73/504.12, 504.16
See application file for complete search history.

(56) References Cited

U.S. PATENT DOCUMENTS

| 6,250,157 | B1 * | 6/2001 | Touge ...................... 73/504.12 |
| 6,467,348 | B1 * | 10/2002 | Song et al. ............... 73/504.12 |
| 7,617,728 | B2 * | 11/2009 | Cardarelli ............... 73/504.16 |
| 2010/0064805 | A1 * | 3/2010 | Seeger et al. ............. 73/504.12 |

FOREIGN PATENT DOCUMENTS

DE    10 2008 042 369    4/2010

* cited by examiner

*Primary Examiner* — John Chapman, Jr.
(74) *Attorney, Agent, or Firm* — Kenyon & Kenyon LLP

(57) ABSTRACT

A yaw rate sensor includes: at least one Coriolis element; a drive device connected to the Coriolis element and configured to drive a vibration of the Coriolis element; a detection device having at least one rotor; and a coupling device connected to the detection device and to the Coriolis element. The coupling device is configured to couple a deflection in the plane of vibration of the Coriolis element to the detection device in a direction orthogonal to the vibration, so that when the Coriolis element is deflected a torque for driving the at least one rotor is transmitted from the Coriolis element to the at least one rotor.

8 Claims, 7 Drawing Sheets

YAW RATE SENSOR

BACKGROUND OF THE INVENTION

1. Field of the Invention

The present invention relates to a yaw rate sensor.

2. Description of the Related Art

It is known to mount a yaw rate sensor on a rotatable body in order to measure a yaw rate of a rotary motion of the body. A yaw rate sensor generally has two vibration-capable masses, which may also be referred to as partial vibrators, i.e., a first vibrating mass and a second vibrating mass which may be driven to vibrate in the opposite direction with the aid of a drive. This means that the first vibrating mass and the second vibrating mass vibrate phase-shifted by 180° (antiparallel) with respect to one another. Therefore, the vibrating motions of the first vibrating mass and of the second vibrating mass are also frequently referred to as vibrating motions in phase opposition, or also as an antiparallel mode.

When the body having the yaw rate sensor mounted thereon undergoes a rotary motion about a rotational axis which is not parallel to the vibration direction of the vibrating masses, and at the same time the two vibrating masses are excited to undergo their antiparallel vibrating motions, Coriolis forces act on the two vibrating masses. As a result of the Coriolis forces, the two vibrating masses are each deflected perpendicularly to their vibration direction. The two vibrating masses are deflected in opposite directions due to the antiparallelism of the vibrating motions of the two vibrating masses. Such an opposed vibration direction may also be referred to as an antiparallel detection vibration. This antiparallel detection vibration may be capacitively detected and converted into a yaw rate with the aid of an evaluation electronics system. The deflection of a vibrating mass is proportional to the Coriolis force acting on the vibrating mass. Thus, the deflection of the vibrating mass corresponds to the yaw rate of the rotary motion of the body.

Such a yaw rate sensor is known from published German patent application document DE 10 2008 042 369 A1, for example.

In addition to their two use modes, i.e., the drive mode and the detection mode, such yaw rate sensors in the related art may have additional vibration modes, so-called spurious modes. These spurious modes are superimposed during operation of the yaw rate sensor, and may result in false signals.

BRIEF SUMMARY OF THE INVENTION

An object of the present invention, therefore, is to provide a yaw rate sensor which overcomes the known disadvantages and which in particular effectively suppresses spurious modes, thus avoiding false signals.

The present invention includes the concept of providing a yaw rate sensor having a drive device, at least one Coriolis element, and a detection device having at least one rotor. The Coriolis element includes in particular a vibration-capable mass. A Coriolis element may also be referred to as a Coriolis vibrator. Multiple Coriolis elements may also preferably be provided, and in particular two Coriolis elements are formed. The drive device is also connected to the Coriolis element in such a way that the Coriolis element undergoes vibration. When multiple, in particular two, Coriolis elements are formed, the drive device is connected to the multiple Coriolis elements in such a way that the Coriolis elements undergo a vibration in the opposite direction. In particular in the case of two Coriolis elements, the two Coriolis elements undergo an antiparallel collinear drive vibration.

The yaw rate sensor also includes a coupling device which is connected to the detection device and to the Coriolis element. This coupling device couples a deflection of the Coriolis element in the plane of vibration to the detection device in a direction orthogonal to the vibration. When the Coriolis element is appropriately deflected, a torque is thus transmitted from the Coriolis element to the at least one rotor, thus driving the at least one rotor. The detection device preferably includes a rotor. In other examples of specific embodiments of the yaw rate sensor, the detection device includes multiple rotors, in particular two rotors.

The yaw rate sensor according to the present invention is described below using two Coriolis elements as an example. However, the present invention is not limited thereto. In the simplest case, one Coriolis element is sufficient. In one preferred embodiment, the yaw rate sensor may be a micromechanical yaw rate sensor.

The three spatial axes, i.e., the x axis, the y axis, and the z axis, are defined as follows for the discussion below. The y axis is parallel to the vibration of the two Coriolis elements; i.e., the drive device excites the two Coriolis elements to undergo an antiparallel collinear drive vibration along the y axis. The x axis is orthogonal to the y axis and is situated in the plane of the drive vibration. The z axis is orthogonal to the x and the y axes, and is orthogonal to the plane of the drive vibration.

Thus, when the yaw rate sensor is rotated so that a yaw rate is formed which has a component perpendicular to the plane of vibration, i.e., a component in the z direction, such a yaw rate results in an action of force which causes an antiparallel and non-collinear deflection of the two Coriolis elements along the x axis. Such a deflection may also be referred to as a detection vibration. The Coriolis elements take part in this vibration, and with the aid of the coupling device transmit their motion to the detection device, in particular to the rotor or the rotors.

The detection device may also preferably be referred to as a detection vibrator. Since the detection vibration of the Coriolis elements, i.e., the Coriolis vibrators, is not collinear, it is able to cause a rotatory motion of the detection vibrator, i.e., the detection device, in particular of the at least one rotor, to which it transmits a torque. The rotor is therefore driven; i.e., a rotatory deflection is caused. This rotatory deflection may then, for example, be detected and in particular converted into a yaw rate with the aid of an evaluation electronics system.

For the yaw rate sensor according to the present invention, spurious modes, in particular a parallel detection mode and a parallel drive mode, are shifted to higher frequencies than for the known yaw rate sensors. In particular for the parallel detection mode, both Coriolis elements move in the same direction along the x axis. In particular for the parallel drive mode, the drive means and the Coriolis elements move in the same direction along the y axis. This increased separation of use modes and spurious modes in the frequency range results in a lesser excitation of the spurious modes, and thus in particularly stable operation.

In one exemplary specific embodiment of the yaw rate sensor, the two Coriolis elements are coupled to one another. Such a coupling may be achieved, for example, using a coupling spring; i.e., the two Coriolis elements are coupled with the aid of such a coupling spring. This offers the particular advantage that degeneration between a parallel and an antiparallel drive mode may be eliminated.

According to another exemplary specific embodiment of the yaw rate sensor, the drive device has two drive means which are each connected to a Coriolis element. Such a drive means may also be referred to as a drive vibrator. A drive means preferably has a drive comb for an electrostatic drive. Such a drive comb has in particular an interdigital structure. According to another preferred embodiment of the yaw rate sensor, the two drive means are coupled to one another, for example with the aid of a coupling spring. According to yet another exemplary specific embodiment, it may be provided that the two Coriolis elements are coupled to one another and that the drive means are coupled to one another, for example with the aid of springs, preferably coupling springs, torsion springs, bending springs, U springs, or S springs.

In yet another preferred specific embodiment of the yaw rate sensor, the yaw rate sensor includes a substrate. The drive device, the two Coriolis elements, and the detection device are preferably situated, in particular anchored, on the substrate. However, the two Coriolis elements and the detection device are situated on the substrate in such a way that the two Coriolis elements as well as the detection device, in particular the at least one rotor, are able to freely vibrate. The use of a substrate offers the particular advantage that such a yaw rate sensor may be installed easily and with little complexity in devices such as mobile telephones, portable multimedia players, or portable computers, for example. In this regard, the use is not intended to be limited solely to the above-referenced devices. All devices in which a yaw rate is to be determined are conceivable.

In another exemplary embodiment of the yaw rate sensor, the at least one rotor has two concentric circular elements having different radii. An electrode is situated between the two circular elements in a radial or spoke-like configuration. Multiple electrodes are preferably situated between the two circular elements in a radial or spoke-like configuration. Such a rotor is preferably centrally fastened to the substrate in the inner circular element, and in particular the rotor is centrally suspended on the substrate in the inner circular element via bending springs. A bending spring may preferably be formed as a torsion spring, extension spring, U spring, or S spring. The rotatory deflection, i.e., a rotation of the rotor, i.e., a rotation of the radially situated electrode or the radially situated electrodes, may then be capacitively detected, for example using a stationary electrode or multiple stationary electrodes. The stationary electrode may also be referred to as a counter electrode. The counter electrode or the counter electrodes is/are preferably enclosed by the detection device. The capacitively detected rotatory deflection may then be converted into a yaw rate, for example with the aid of an evaluation electronics system.

DETAILED DESCRIPTION OF THE INVENTION

Figure 1:
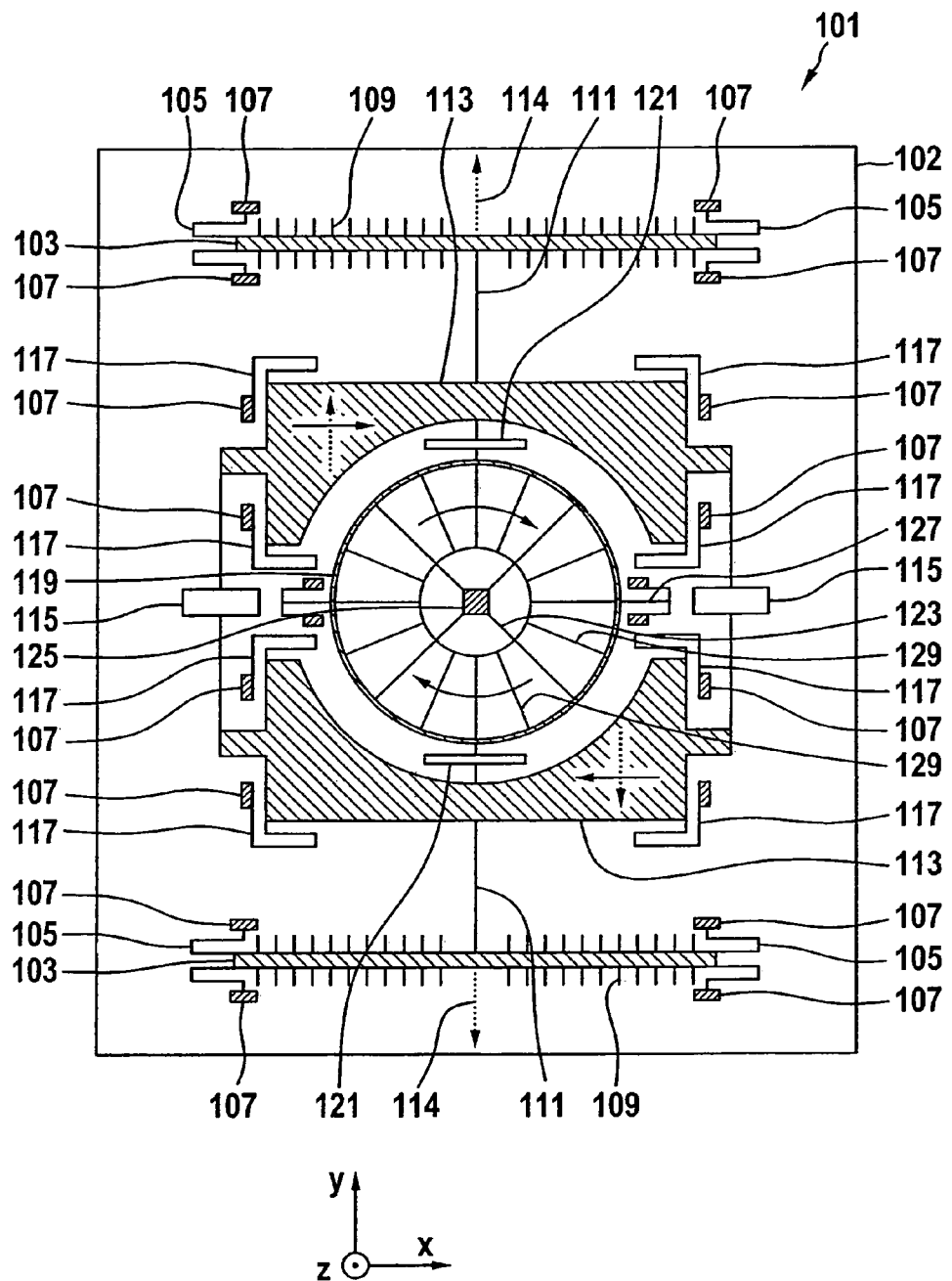
FIG. 1 shows a yaw rate sensor.

In the following discussion, identical elements are denoted by the same reference numerals in the figures.

FIG. 1 shows a yaw rate sensor 101 which includes a substrate 102. In one specific embodiment which is not shown, the yaw rate sensor is designed as a micromechanical yaw rate sensor. Substrate 102 has a rectangular shape. This means that substrate 102 is a rectangular substrate. In another exemplary embodiment which is not shown, substrate 102 may also have a square shape. In other exemplary embodiments which are not shown, substrate 102 may also have a triangular shape or a polygonal shape, in particular a pentagonal, hexagonal, or octagonal shape. In one particularly preferred specific embodiment which is not shown, substrate 102 may also have a circular or ellipsoidal shape.

Yaw rate sensor 101 also has a drive device having two drive means 103. The two drive means 103 are respectively situated in an upper and a lower region of substrate 102. Drive means 103 are fastened to anchoring means 107 on substrate 102 via suspension means 105. As a result of suspension means 105, drive means 103 are movable in the direction of the y axis. Drive means 103 are preferably suspended on anchoring means 107 with the aid of a spring (105) as suspension means. The spring is preferably a U spring.

Drive means 103 each include drive combs 109. Drive combs 109 are preferably designed to be an interdigital structure. Drive combs 109 are preferably configured for an electrostatic drive.

Drive means 103 each have a coupling web 111, situated perpendicularly to drive combs 109, which couples each of drive means 103 to a Coriolis element 113. This means that coupling webs 111 connect the two drive means 103 to the two Coriolis elements 113 for driving a vibration in the opposite direction of the two Coriolis elements 113. The two Coriolis elements 113 have an arched shape, for example. Coriolis elements 113 are suspended on anchoring means 107 via Coriolis suspension means 117, anchoring means 107 being fastened to substrate 102. Coriolis suspension means 117 have the particular result that Coriolis elements 113 are movable in the direction of the x and the y axes. Coriolis suspension means 117 are preferably formed as bending springs, in particular as meandering bending springs. This means that the bending springs may have a meandering shape. In particular, the loops of the meander are parallel to the x and the y axes. A square meandering shape may preferably be provided. The meandering bending springs are designed to pass around corners, in a manner of speaking.

Arrows 114 denote, for example, a motion of the two Coriolis elements 113 during a half-phase, i.e., when the two drive means 103 drive the two Coriolis elements 113 for a vibration in the opposite direction.

Yaw rate sensor 101 also has a detection device which includes a rotor 119. Rotor 119 is coupled to the two Coriolis elements 113 with the aid of a coupling device. In the exemplary embodiment shown here, the coupling device includes two coupling springs 121, each of which couples a Coriolis element 113 to rotor 119. Thus, the detection device is connected to the two Coriolis elements 113 in such a way that a deflection in the plane of vibration of the two Coriolis elements, i.e., in the x-y plane, is coupled to the detection device in a direction orthogonal to the vibration, i.e., in the direction of the x axis. Thus, when the two Coriolis elements 113 are appropriately deflected in the direction of the x axis, a torque for driving rotor 119 is transmitted from the two Coriolis elements 113 to rotor 119.

Rotor 119 itself is suspended with the aid of at least one bending bar 123; i.e., multiple bending bars may also be provided for the suspension, bending bar 123 being mounted on substrate 102 with the aid of a centrally situated rotor substrate anchoring means 125. Rotor 119 also has laterally situated rotor substrate suspension means 127, via which anchoring means 107 are fastened or anchored to substrate 102. Rotor substrate suspension means 127 may in particular include U springs, preferably one or multiple double U springs. Rotor substrate suspension means 127 may preferably include one or multiple torsion springs and/or one or multiple bending springs.

Rotor 119 has multiple radially situated detection electrodes 129. In the exemplary embodiment shown here, 16 detection electrodes are formed. In another exemplary embodiment which is not shown, four detection electrodes, in particular 16, preferably 32, for example 64, detection electrodes may also be formed. In another exemplary embodiment which is not shown, the number of detection electrodes is divisible by four. Detection electrodes 129 are enclosed on both sides by stationary electrodes (not shown), thus allowing a deflection of detection electrodes 129 to be capacitively detected. This rotatory deflection relative to the stationary electrodes, which may also be referred to as counter electrodes, may then be converted into a yaw rate with the aid of an evaluation electronics system (not shown).

During operation of yaw rate sensor 101, drive means 103 excite the two Coriolis elements 113 to an antiparallel and collinear drive vibration along the y axis. Drive combs 109 and drive means 103 as well as the two Coriolis elements 113 take part in this drive vibration. The detection device, which may also be referred to as a detection vibrator, does not take part in this drive vibration. This is achieved in particular with the aid of suitable spring suspensions for substrate 102, and with the aid of suitable springs between the individual components.

A yaw rate of yaw rate sensor 101 having a component perpendicular to substrate 102, i.e., in the direction of the z axis, results in an action of force which causes an antiparallel and non-collinear deflection of Coriolis elements 113 along the x axis. This deflection along the x axis may also be referred to as a detection vibration. The two Coriolis elements 113 take part in this detection vibration and transmit their motion to the detection device, i.e., the detection vibrator. Drive combs 109 do not take part in the detection vibration. Since the detection vibration of Coriolis elements 113 is not collinear, Coriolis elements 113 may cause a rotary motion of the detection vibrator to which they transmit a torque.

As a result of this torque transmission, rotor 119 is rotatorily deflected, as illustrated in FIG. 1 by two curved arrows provided in a circle.

In the exemplary embodiment shown in FIG. 1, the two Coriolis elements 113 are coupled to one another with the aid of a Coriolis coupling spring 115. A particular result of Coriolis coupling spring 115 is that degeneration between the parallel and the antiparallel drive modes is eliminated. Coriolis coupling spring 115 is merely optional; i.e., yaw rate sensor 101 may also have no Coriolis coupling spring 115 of this type. This means that the two Coriolis elements 113 are not coupled to one another. In this regard, the two Coriolis elements 113 are decoupled in this exemplary embodiment (not shown).

The concept of the present invention, to couple the two Coriolis elements 113 to a detection device having a rotor 119 with the aid of a coupling device, in the present case, for example, including coupling springs 121, offers the particular advantage that spurious modes, in particular the parallel detection mode and the parallel drive mode, are shifted to higher frequencies than for the yaw rate sensors known heretofore. The two Coriolis elements 113 move in the same direction along the x axis in the parallel detection mode. In the parallel drive mode, drive means 103 and Coriolis elements 113 move in the same direction along the y axis.

Figure 2:
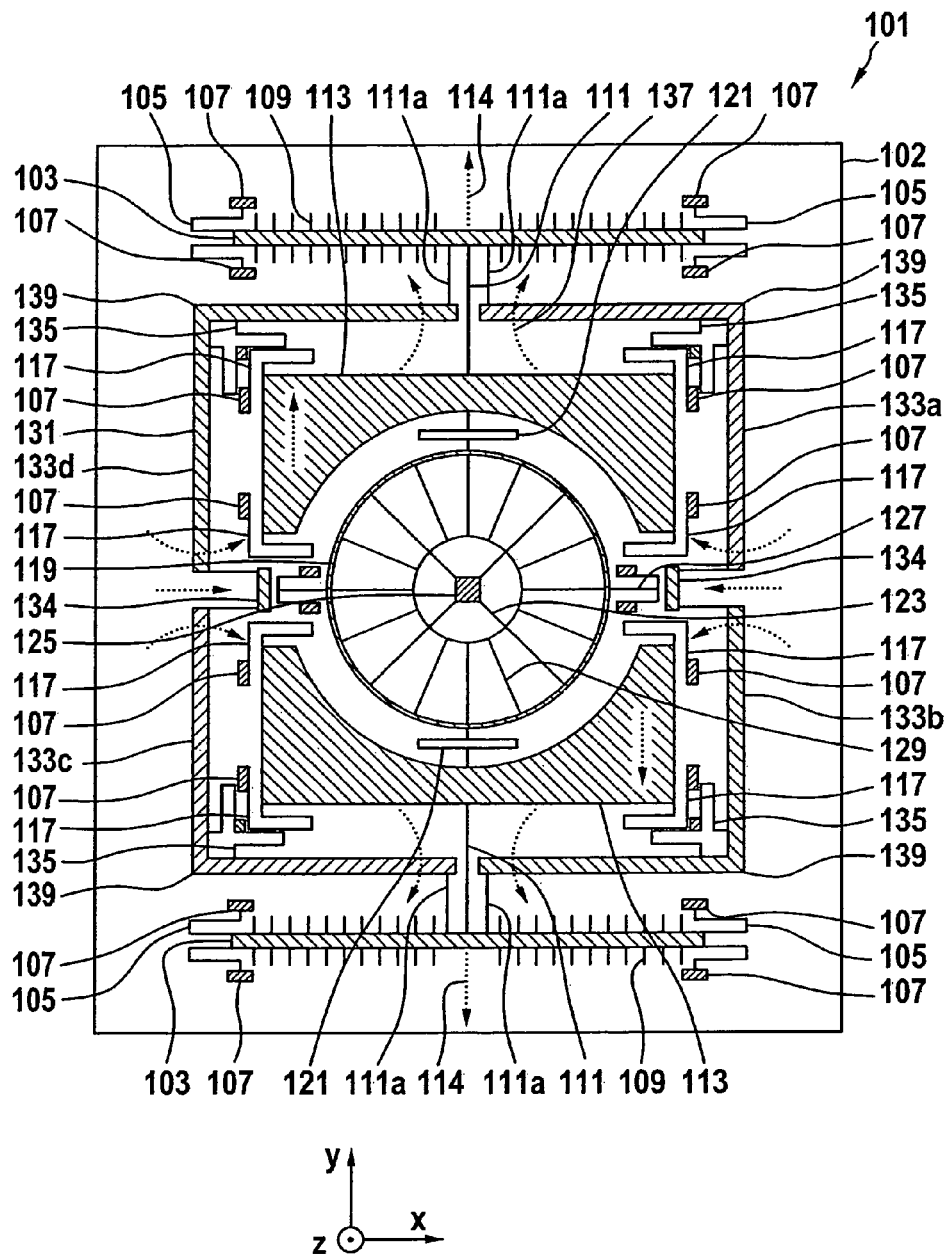
FIG. 2 shows the yaw rate sensor from FIG. 1, having a deflection frame.

FIG. 2 shows yaw rate sensor 101 from FIG. 1; in the exemplary embodiment shown in FIG. 2, yaw rate sensor 101 has a deflection frame 131. Deflection frame 131 is formed circumferentially around Coriolis elements 113 and the detection device having rotor 119. Deflection frame 131 is formed by four legs 133a, 133b, 133c, and 133d, whereby legs 133a, 133b, 133c, and 133d each have a right-angled shape. Legs 133a and 133d are each coupled to corresponding legs 133b and 133c, respectively, via a leg coupling spring 134. In addition, legs 133a, 133b, 133c, and 133d are each coupled to drive combs 109 via an additional coupling web 111a, so that for a drive motion of drive combs 109, corresponding legs 133a, 133b, 133c, and 133d are also driven. Legs 133a, 133b, 133c, and 133d are suspended on the substrate with the aid of deflection frame suspension means 135. Deflection frame suspension means 135 in particular include substrate anchoring means and springs, in particular bending springs, torsion springs, U springs, or S springs. The suspension is configured in such a way that for a drive motion of drive combs 109, legs 133a, 133b, 133c, and 133d are able to undergo a motion about an imaginary center of rotation 139. This motion of legs 133a, 133b, 133c, and 133d is indicated by curved, dashed-line arrows 137.

With the aid of deflection frame 131, which couples drive means 103 to one another, degeneration between the parallel (spurious mode) and the antiparallel (use mode) drive modes is eliminated, and the spurious mode becomes more rigid than the use mode. This is due to the differing rigidity of leg coupling spring 134, which may also be referred to as a transmission spring, with respect to stress in the same direction (bending) or in the opposite direction (shear).

Figure 3:
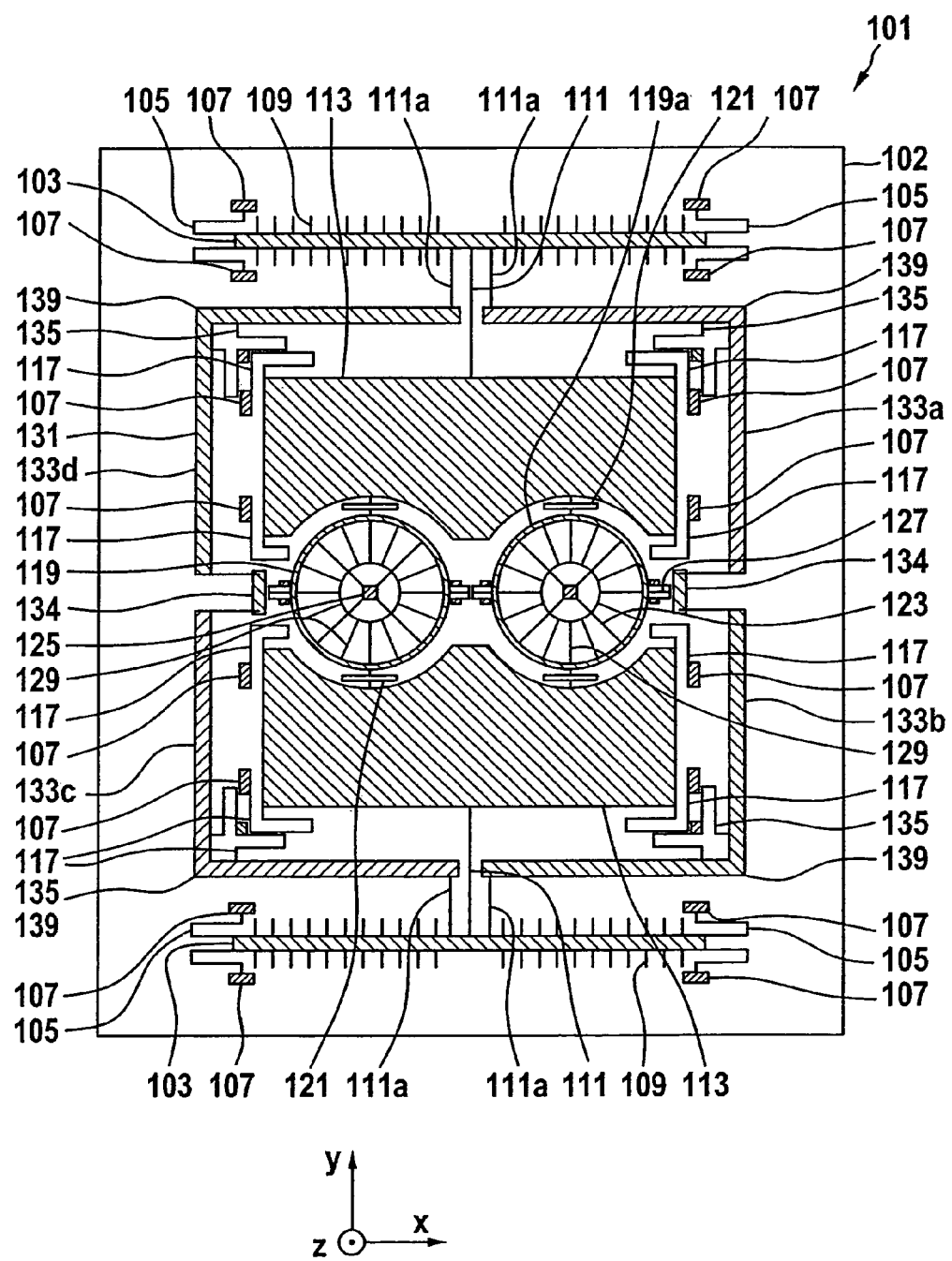
FIG. 3 shows a yaw rate sensor having two rotors.

FIG. 3 shows another specific embodiment of a yaw rate sensor 101, in this case the detection device having two rotors 119 and 119a. The two rotors 119, 119a are suspended on substrate 102, similarly as for the exemplary embodiments shown in FIGS. 1 and 2. Here as well, a particularly efficient suppression of modes, in particular spurious modes, is achieved with the aid of coupling springs 121 which transmit a torque from Coriolis elements 113 to rotors 119, 119a. In the exemplary embodiment shown in FIG. 3, Coriolis elements 113 have a double-arch shape.

Figure 4:
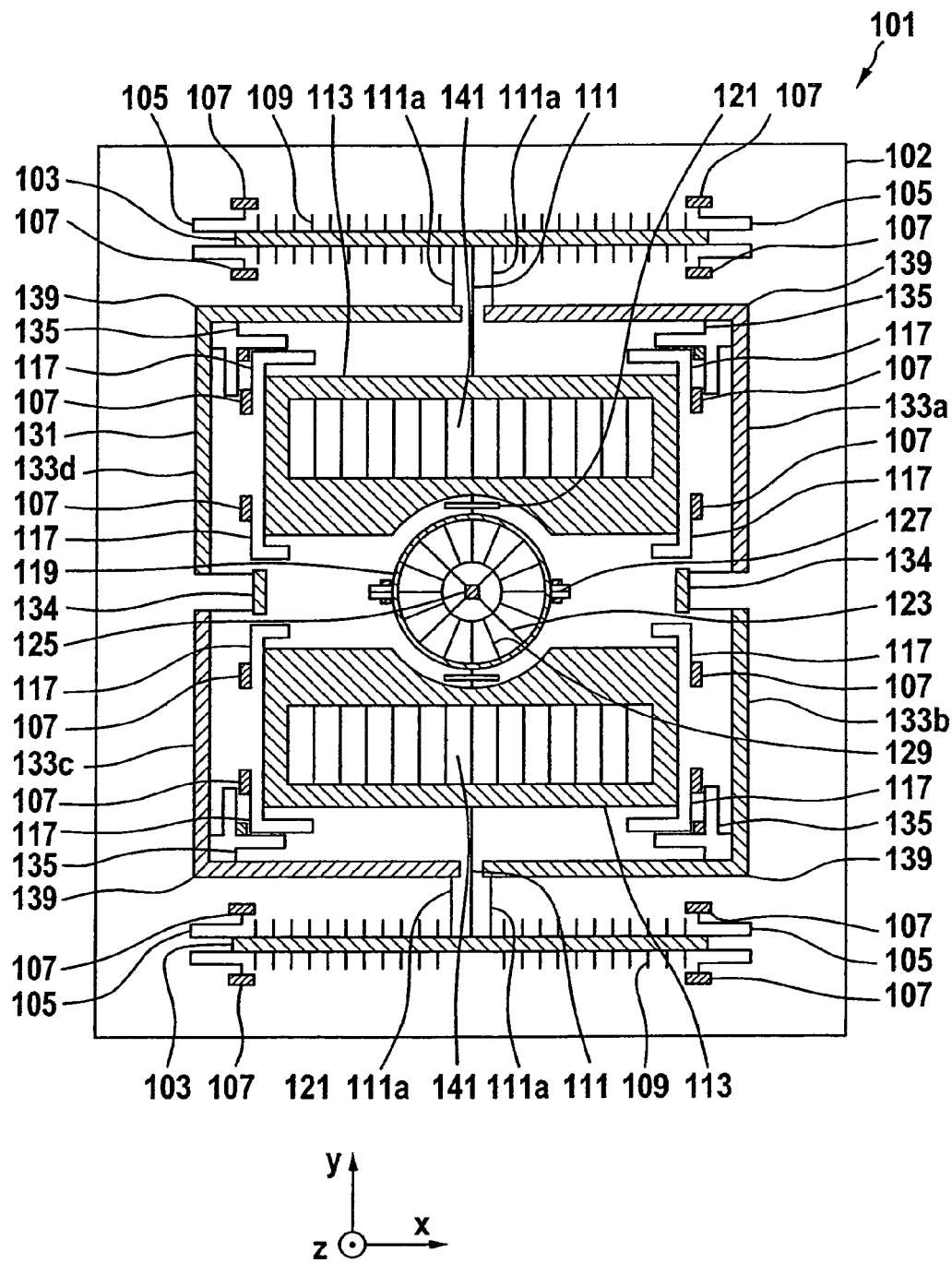
FIG. 4 shows another yaw rate sensor having one rotor.

FIG. 4 shows another example of an exemplary embodiment of a yaw rate sensor 101; in this case, Coriolis elements 113 each have multiple additional detection electrodes 141 in addition to the features in the previous exemplary embodiments. Additional detection electrodes 141 are preferably situated in and/or beneath Coriolis elements 113. Additional detection electrodes 141 in particular are situated parallel to one another. In particular, additional detection electrodes 141 form a grid structure. Two additional detection electrodes are preferably formed. For example, more than two additional detection electrodes may also be formed. The additional detection electrodes are preferably situated in Coriolis elements 113 and also beneath Coriolis elements 113. It may also be provided that one or multiple detection electrodes 141 is/are situated on and/or beneath other elements of the yaw rate sensor. Quadrature equalization and electrostatic regenerative feedback may be advantageously achieved in this way. In addition, particularly sensitive capacitive detection of the rotatory deflection of rotor 119 is advantageously possible with the aid of additional detection electrodes 141.

Figure 5:
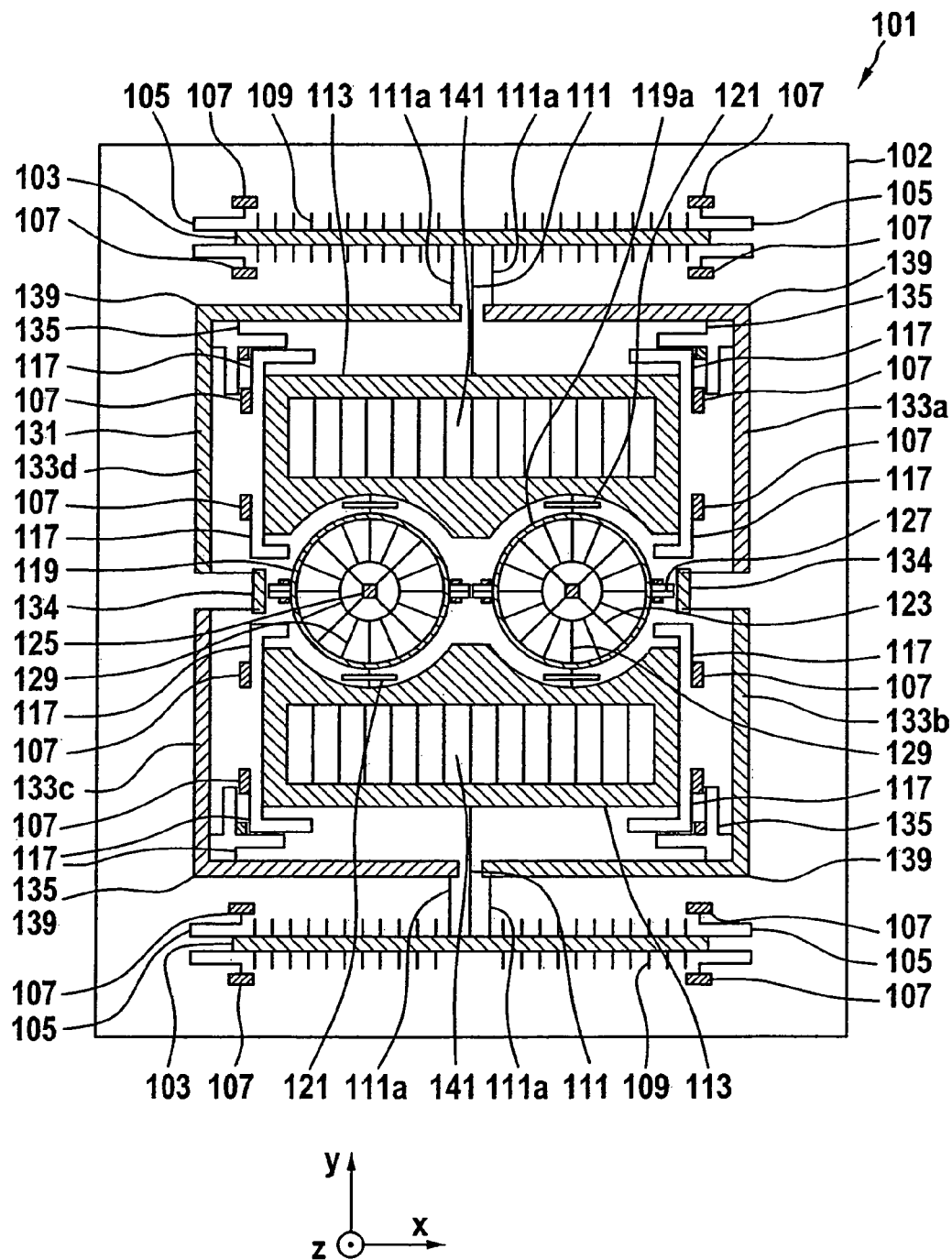
FIG. 5 shows a modification of the yaw rate sensor from FIG. 4, having two rotors.

FIG. 5 shows yaw rate sensor 101 from FIG. 4 in a variant having two rotors 119 and 119a. This specific embodiment offers the particular advantage that spurious modes may be suppressed in a particularly efficient manner.

Figure 6:
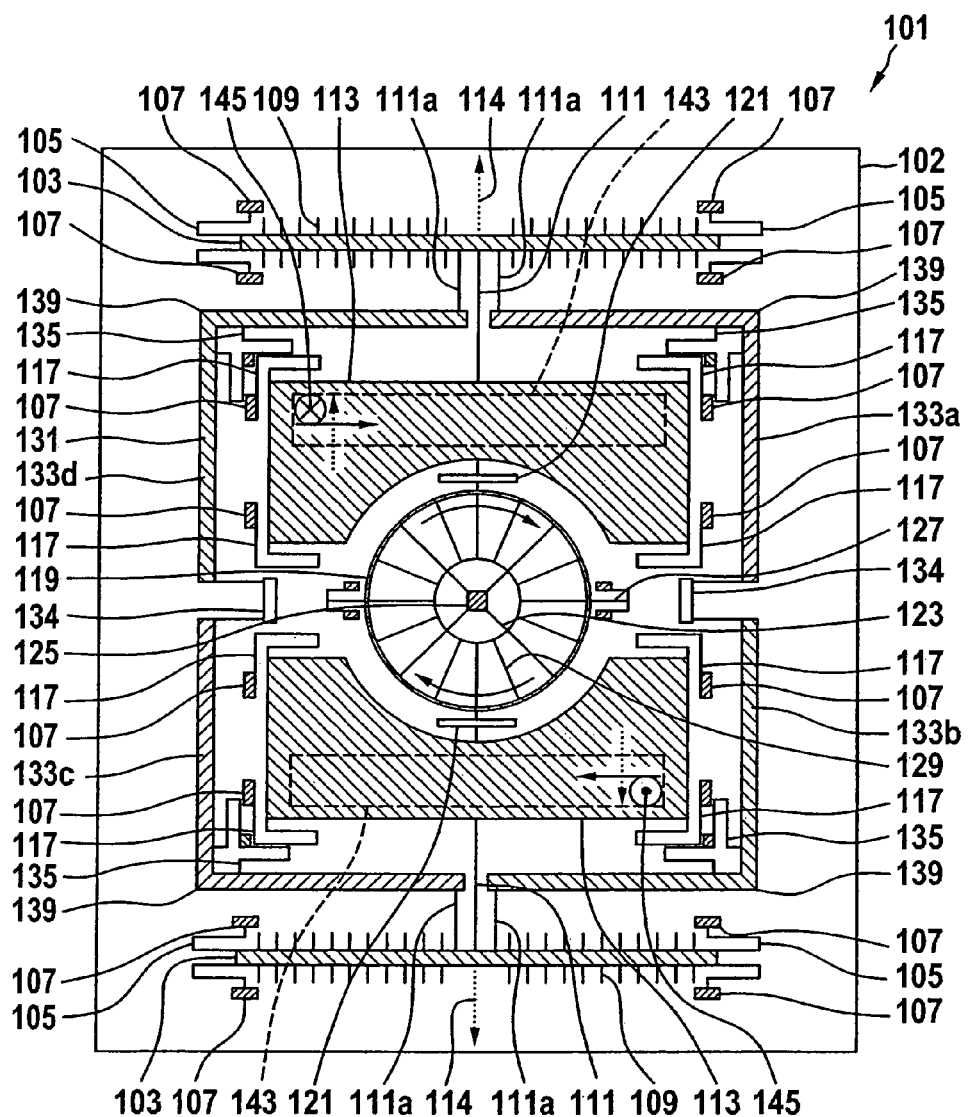
FIG. 6 shows yet another yaw rate sensor.

FIG. 6 shows yet another specific embodiment of a yaw rate sensor 101. In this case, Coriolis elements 113 have additional electrodes 143, thus allowing a yaw rate about the z axis and about the x axis to be measured at the same time. In this regard, yaw rate sensor 101 may also be referred to as a dual-channel yaw rate sensor. When a yaw rate is present about the x axis, a Coriolis force 145 acts on Coriolis elements 113 in the direction of the z axis, and may then be evaluated with the aid of additional electrodes 143. In another exemplary embodiment which is not shown, yaw rate sensor 101 shown in FIG. 6 may also include two rotors. Additional electrodes 143 are situated beneath Coriolis elements 113, preferably on the substrate. According to another exemplary embodiment which is not shown, additional electrodes 143 may also be situated beneath rotor 119 or beneath rotors 119 and 119a, in particular on the substrate. According to yet another preferred embodiment, additional electrodes 143 are situated above Coriolis elements 113 and/or rotor 119, or rotors 119, 119a. For example, a cantilever, in particular multiple cantilevers, may be provided on the substrate which, like a crane, holds additional electrodes 143 above Coriolis elements 113 and rotors 119, 119a.

According to another preferred specific embodiment, additional electrodes 143 may also be integrated into a cover (not shown) or situated on same. This cover preferably covers substrate 102, so that a yaw rate sensor housing is formed. The cover is preferably glued to substrate 102. For example, an inner space in the yaw rate sensor housing is evacuated. This means that a vacuum or negative pressure prevails in the inner space. Additional electrodes 143 which are situated in or integrated into such a cover may also be referred to as cover electrodes. A negative pressure in particular results in decreased motion resistance for the vibrating and rotating elements. In this way a lower drive voltage may advantageously be applied to the drive device. Rotor substrate suspension means 127 may preferably include one or multiple torsion springs and/or one or multiple bending springs. In particular a so-called out-of-plane-detection device is thus formed. This means that when yaw rate sensor 101 is appropriately rotated, rotor 119 may thus be tilted or bent about the x axis, also out of the drawing plane. Additional electrodes 143 detect this motion of rotor 119 out of the drawing plane, and convert same into a yaw rate relative to the x axis.

A cover as described in conjunction with the description of FIG. 6 may also be used for the additional exemplary embodiments shown in FIGS. 1 through 5. The cover may or may not have cover electrodes.

Figure 7:
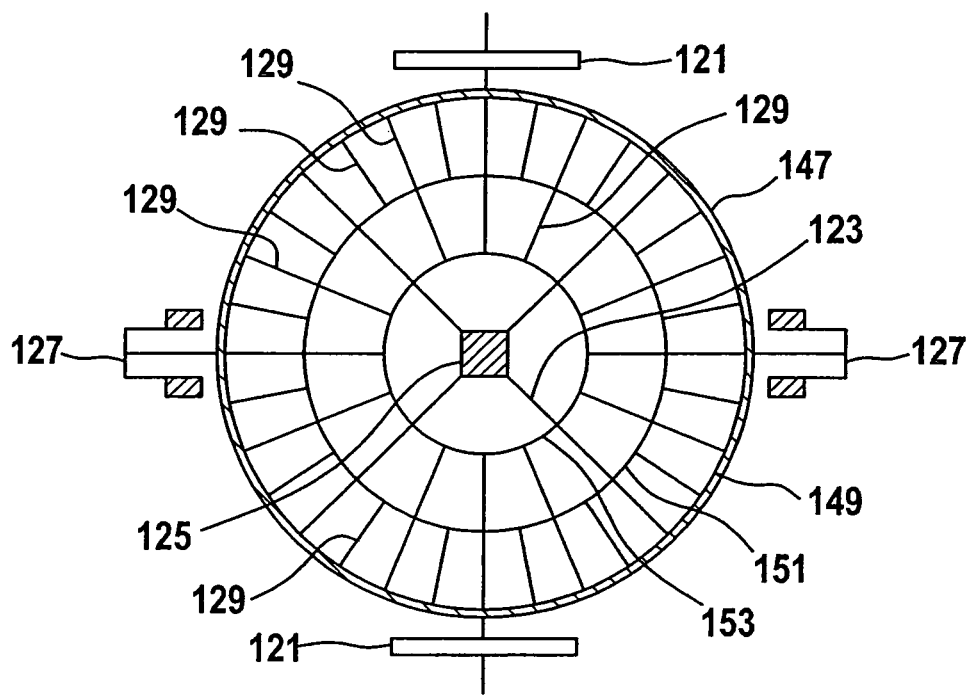
FIG. 7 shows a rotor.
Figure 7:
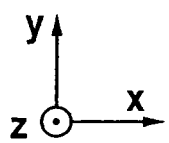

FIG. 7 shows a rotor 147 which may be used in particular in the specific embodiments shown in FIGS. 1 through 6. Rotor 147 includes three concentric rotor rings 149, 151, and 153. An outer circular strip is formed by rotor rings 149 and 151, and an inner circular strip is formed by rotor rings 151 and 153. Multiple detection electrodes 129 are radially situated on this strip, similar to spokes of a wheel. Thus, more detection electrodes 129 may advantageously be provided per circular section than for rotors 119 and 119a. In particular, improved detection of a yaw rate of the yaw rate sensor may be achieved in this way. In addition, improved time resolution is thus possible. This means that the yaw rate sensor is also able to detect changes in the yaw rate in small time windows, for example in the µs or ms range. In another exemplary specific embodiment which is not shown, detection electrodes 129 are flanked on both sides by counter electrodes; i.e., the counter electrodes are situated to the left and to the right of detection electrodes 129.

What is claimed is:

1. A yaw rate sensor, comprising:
at least one Coriolis element;
a drive device connected to the Coriolis element and configured to drive a vibration of the Coriolis element;
a detection device having at least one rotor; and
a coupling device connected to the detection device and to the Coriolis element, wherein the coupling device is configured to couple a deflection in the plane of vibration of the Coriolis element to the detection device in a direction orthogonal to the vibration, so that when the Coriolis element is deflected a torque for driving the at least one rotor is transmitted from the Coriolis element to the at least one rotor;
wherein the coupling device is directly connected to the Coriolis element, the coupling device being separate and distinct from a deflection frame which at least partially surrounds the Coriolis element;
wherein two Coriolis elements are provided; and
wherein the two Coriolis elements are coupled to one another.

2. The yaw rate sensor as recited in claim 1, wherein the drive device has two drive elements which are each connected to a Coriolis element.

3. The yaw rate sensor as recited in claim 2, wherein the two drive elements are coupled to one another.

4. The yaw rate sensor as recited in claim 3, wherein the two drive elements are coupled to one another with the aid of a deflection frame which at least partially surrounds the Coriolis elements.

5. The yaw rate sensor as recited in claim 4, wherein the deflection frame includes at least two parts coupled to one another.

6. The yaw rate sensor as recited in claim 2, wherein the at least one rotor has a radially situated detection electrode.

7. The yaw rate sensor as recited in claim 6, wherein at least one of the two Coriolis elements has at least one additional electrode.

8. The yaw rate sensor as recited in claim 2, wherein the detection device has a stationary electrode.

* * * * *